United States Patent
Kharshan et al.

(10) Patent No.: US 8,790,457 B1
(45) Date of Patent: *Jul. 29, 2014

(54) BIO-BASED CORROSION INHIBITORS

(71) Applicant: Cortec Corporation, St. Paul, MN (US)

(72) Inventors: Margarita Kharshan, Little Canada, MN (US); Alla Furman, Shoreview, MN (US); Kristy Gillette, Maplewood, MN (US); Robert Kean, Minneapolis, MN (US)

(73) Assignee: Cortec Corporation, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/783,519

(22) Filed: Mar. 4, 2013

Related U.S. Application Data

(63) Continuation of application No. 13/465,086, filed on May 7, 2012, now Pat. No. 8,409,340.

(51) Int. Cl.
   *C09D 5/08* (2006.01)
   *C09D 103/00* (2006.01)
   *C09D 105/00* (2006.01)
   *C23F 11/10* (2006.01)
   *C23G 1/06* (2006.01)
   *C23G 1/08* (2006.01)

(52) U.S. Cl.
   CPC ......... *C09D 5/08* (2013.01); *C09D 103/00* (2013.01); *C09D 105/00* (2013.01); *C23F 11/10* (2013.01); *C23G 1/06* (2013.01); *C23G 1/081* (2013.01); *C23G 1/083* (2013.01); *C23G 1/088* (2013.01)
   USPC ............ 106/14.05; 106/14.22; 106/14.24; 106/14.44; 252/388; 252/396

(58) Field of Classification Search
   USPC ............ 106/14.05, 14.24, 14.44, 14.22; 252/388, 396
   See application file for complete search history.

(56) References Cited

U.S. PATENT DOCUMENTS

| | | | |
|---|---|---|---|
| 6,506,318 B1 * | 1/2003 | Sapienza et al. | 252/70 |
| 7,566,469 B2 | 7/2009 | Scheimann | |
| 7,658,861 B2 | 2/2010 | Koefod | |
| 8,367,378 B2 * | 2/2013 | Balan et al. | 435/99 |
| 8,409,340 B1 * | 4/2013 | Kharshan et al. | 106/14.05 |
| 8,440,095 B1 * | 5/2013 | Kharshan et al. | 252/70 |
| 2009/0123609 A1 * | 5/2009 | Harris et al. | 426/69 |
| 2010/0092603 A1 | 4/2010 | Bruinsma et al. | |

OTHER PUBLICATIONS

CC Technologies, "Cost of Corrosion", webpage: http://www.corrosioncost.com, 2002.

Kansas Ethanol, "Clean Fuel from Kansas Farms", http://ksgrains.com/ethanol/ddgs/html. 2004.

Abdel-Gaber, A.M.; And-El Nabey, B.S.; Sidahmed, I.M.; El-Zayady, A.M.; Saadawy, M.; "Effect of Temperature on Inhibitive Action of Damsissa Extract on the Corrosion of Steel in Acidic Media", Corrosion. 2003 62, Num 04. Abstract Only.

Odiongenyi, A.O., et al., "Corrosion Inhibition and Adsorption Properties of Ethanol Extract of Vernonia Amygdalina for the Corrosion of Mild Steel in H2SO4". Portugaliae Electrochimica Acta. 2009, 29(1), 33-45.

Selvi, J., et al., "Corrosion INhibition by Beet Roote Extract", Portugaliae Electrochimica Acta. 2009, 29(1), 1-11.

Zhao, Weimin, et al., "Effects of Preparation Methods on Corrosion Inhibition Performance of Plant Extracts", Fushi Yu Fanghu, 2009, 30(2_110-112 (Chinese). English Abstract Only.

Rahim, Afidan A; et al., "Recent Development of Vegetal Tannis in Corrosion Protection of Iron and Steel", Recent Patents on Material Science. 2008, 1(3), 223-231.

Subhashini, S., et al., "Eco-Friendly Corrosion Inhibitors from Poultry Waste for Mild Steel in Acid Medium". Material Science Research India. 2008, 5(2) 423-428. Abstract Only.

Kharchenko, U.V., et al., "Effects of Wastes Formed in Processing of Vegetable Raw Materials on the Corrosion of Steel in Corrosive Media", Russian Journal of Applied Chemistry, 2008, 18(9) 1559-1564. Abstract Only.

Youngmi, Kim et al., "Composition of Corn Dry-Grind Ethanol By-Products: DDGS, Wet Cake, and Thin Stillage", ScienceDirect, 2007.

Pacific Northwest Snowfighters, "Pacific Northwest Snowfighers Snow and Ice Control Chemical Products Specification and Test Protocols for the PNS Association of British Columbia, Idaho, Montana, Oregon, and Washington," 2006, Test Method B.

Colorado DOT, "Evaluation of Alternative Anti-Icing and Deicing Compounds Using Sodium Chloride and Magnesium Chloride as Baseline Deicers," DTD Applied Research and Innovation Branch Report No. CDOT-2009-1, Final Report. 2009.

* cited by examiner

*Primary Examiner* — Anthony J Green
(74) *Attorney, Agent, or Firm* — Haugen Law Firm PLP

(57) ABSTRACT

A bio-based corrosion inhibitor composition includes a corn stillage product, and may be a substantially water insoluble fraction of corn stillage. The corrosion inhibitor composition is useful in protecting metal articles from corrosion.

7 Claims, 1 Drawing Sheet

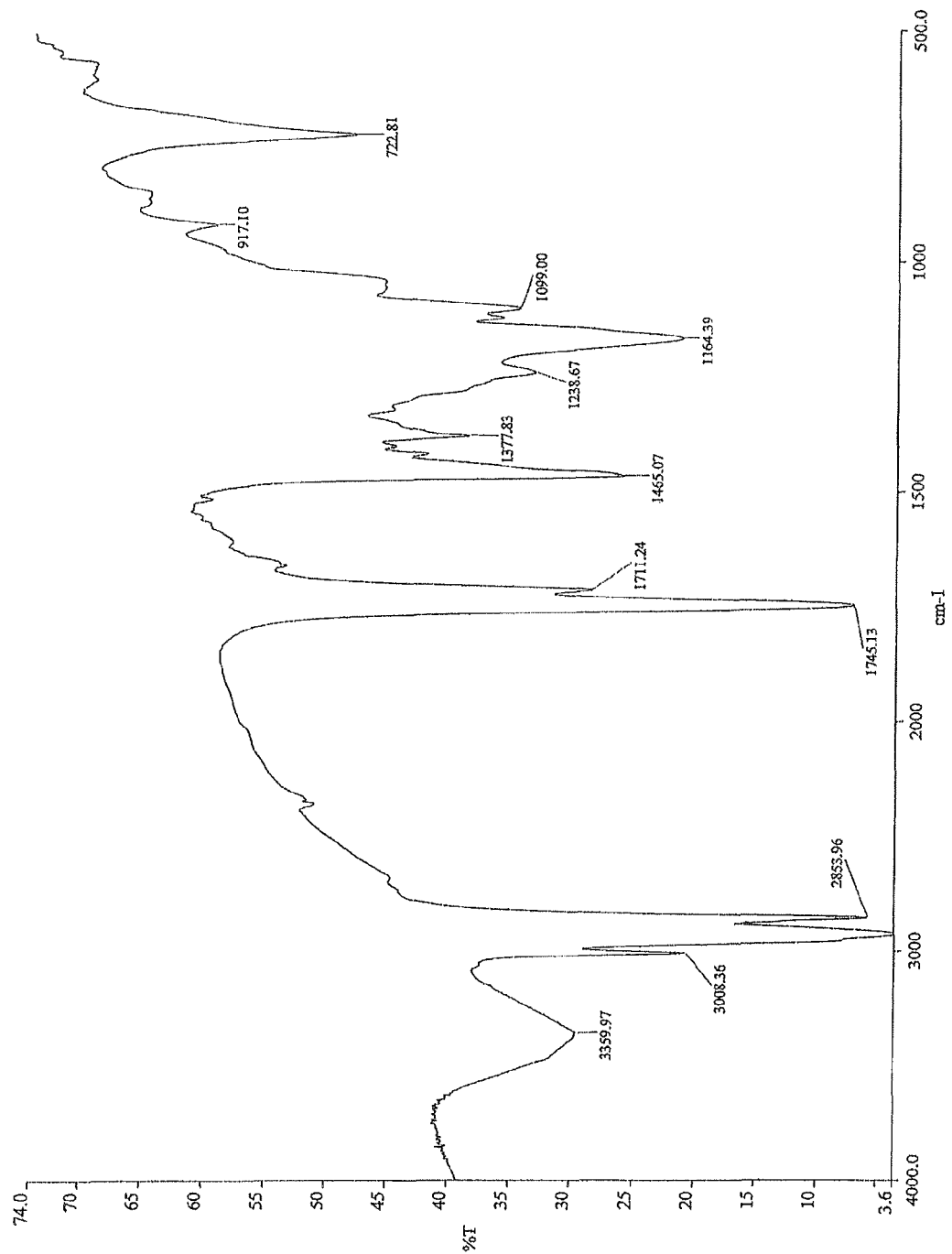

BIO-BASED CORROSION INHIBITORS

CROSS-REFERENCE TO RELATED APPLICATIONS

This application is a continuation of U.S. patent application Ser. No. 13/465,086, filed on May 7, 2012 now U.S. Pat. No. 8,409,340 and entitled "Bio-based Corrosion Inhibitors", which itself claims priority to U.S. Provisional Patent Application Ser. No. 61/483,274, filed on May 6, 2011 and entitled "Bio-Based Corrosion Inhibitors," the contents of which being incorporated herein in their entirety.

FIELD OF THE INVENTION

This invention relates to corrosion inhibitors prepared from bio-based materials, for protection of metallic products such as steel.

BACKGROUND OF THE INVENTION

In commerce and industry today, the useful life of corrodible items may be extended and/or preserved by providing corrosion inhibitors which protect the corrodible item from the adverse effects of its ambient environment. Materials which are of concern for their corrosive properties include gases such as oxygen, water vapor, sulfides, carbon dioxide, aqueous aerosols containing salts or acids, and the like. Among the common indications of corrosion manifested in useful metallic articles are oxidation, pitting, tarnishing, mottling, or surface discoloration. Metals which are frequently found to be susceptible to corrosion under normal atmospheric and ambient conditions are iron, copper, brass, aluminum, silver, and alloys of these metals. Corrosion of steel is of particular economic significance due to the extensive use of steel in transportation vehicles, buildings, tanks and pipelines, industrial equipment, and transportation infrastructure (roads, bridges, etc.). Corrosion inhibitors have been found useful in protecting certain corrodible items against reaction with corrosive environmental factors, which, in the absence of corrosion inhibitors, cause reduction in effectiveness, useful life, and value. Such protection may be needed during packaging, handling, shipment, or end use.

In the past, it has been known to provide a package or other enclosure containing one or more inhibiting compounds along with the corrodible item or items to be protected. Additionally, articles have been protected from corrosion by means of protective coatings in the form of solids, liquids, greases, or pastes.

Steel is often processed at elevated temperatures for forming into sheets or rods, wires, or tubes/pipes. At these elevated temperatures, oxides/scale commonly forms on the surface. Such surface scale is undesirable in the final article and is usually removed by cleaning or pickling in an aqueous acid bath. Hydrochloric acid (HCl) is most commonly used to surface treat carbon steel products. Roughly 55 percent of all steel mill products are pickled. The hydrochloric acid preferentially reacts with oxide and scale, but also dissolves to some extent the steel itself. For this reason, corrosion inhibitors are added to pickling baths. After such surface cleaning, the steel can be very susceptible to reformation of rust (flash corrosion), particularly if the steel is stored for an extended period of time. It is therefore desirable for the corrosion inhibitor used in the cleaning process to provide residual protection to the steel.

A related but less demanding application is the acid cleaning of steel to remove surface rust and/or mineral precipitates (e.g. calcium salts) from processing equipment and/or steel pieces/articles. Such cleaning is typically done at lower temperatures and lower acid concentrations than for pickling, but it is still very important to prevent steel loss and reformation of surface oxides after treatment. The products used in such applications are the same or similar to those used with pickling, but vary somewhat in formulation depending on the strength and type of acid used.

Current corrosion inhibitor products are proven and effective, but they tend to be expensive. Further, some of the cleaning materials may be toxic (inhalation and skin contact risk), flammable, and pose environmental risks. There is accordingly a need for safer and more environmentally friendly corrosion inhibiting products that are also cost effective.

SUMMARY OF THE INVENTION

By means of the present invention, corrosion protection of metal at reasonable cost is provided by use of corrosion inhibitors obtained from corn ethanol stillage.

BRIEF DESCRIPTION OF THE DRAWINGS

FIG. 1 is an FTIR spectrum of the DDGS extract described in Example 1.

DETAILED DESCRIPTION OF THE PREFERRED EMBODIMENTS

The objects, features, and advances represented by the present invention will now be presented in terms of detailed embodiments. Other embodiments and aspects of the invention are recognized as being within the grasp of those having ordinary skill in the art.

Most corn ethanol plants now use a "dry corn milling" process, wherein the corn is ground in a generally dry state (whole, or with some fractions mechanically removed and just the endosperm enriched fraction ground), heated with water and enzymes to break down the starch, followed by yeast fermentation. The resulting ethanol is distilled leaving whole stillage. The whole stillage is centrifuged into solid (distillers grains) and liquid (solubles, thin stillage) fractions. The liquid fraction may be concentrated (by drying) to thick stillage or condensed solubles. The solubles may be recombined with the distillers grains and dried to make distillers dried grains with solubles (DDGS). For the purposes hereof, the term "stillage" refers to whole stillage or fractions thereof.

In the course of investigating corrosion inhibiting properties of agricultural materials, it was surprisingly discovered that fractions recovered from corn stillage, such as solvent extract from distillers dried grains with solubles (DDGS), and crude corn oil, had very good properties for protection of metal from corrosion, alone or in an acidic environment.

The initial extraction was done with ethyl acetate. A variety of other solvents, however, are anticipated to be useful in obtaining an active extract from stillage. Most hydrocarbons that are imiscible with water may be good candidates to obtain the oily stillage extracts discovered herein to exhibit active corrosion inhibition properties. Hexanes and other alkanes, ethers, alcohols, such as methanol, ethanol, propanol, and butanol, petroleum distillates, and mixtures thereof, or one or more suitable solvents, as is known in the art, may be used for oil extraction of the stillage. It is also possible to obtain the corrosion inhibitor component or components by phase separation from an aqueous slurry of stillage (e.g. by centrifugation).

The extracted material is not water soluble (or has only minimal solubility in water), so will likely perform best in situations where it is applied as-is in contact with the corrosion-susceptible article, dispersed in a non-aqueous medium, or floating on top of an aqueous bath.

Many large industrial tanks and processing lines must be hydro-tested periodically to verify the absence of leaks and ability to sustain rated pressures. Such testing requires large volumes of water. In many instances, shortage of readily accessible fresh water requires the use of water from a variety of sources that contain various levels of salts and minerals, which can be corrosive. For this application, it is contemplated that the corrosion inhibitor of the present invention may be applied as a "float coat", wherein the corrosion inhibitor material substantially floats on the surface of the process water, and leaves a protective coating on the metal as the process water is drained. This same technique is used to protect ballast tanks on ships, barges, and other floating structures; especially in preparation for taking them out of service. The extract corrosion inhibitor of the present invention may, for example, be used as a float coat, alone or in combination with other ingredients.

The following examples illustrate the invention, but are not intended to limit it in any way.

EXAMPLES

Example 1

DDGS Extract

Soxhlet extraction was carried out on corn DDGS using ethyl acetate as a solvent. Approximately 20% of the starting weight of DDGS was recovered in the extract. Removal of the solvent yielded an oily liquid, referred to herein as the DDGC extract. The DDGS extract was tested as follows for protection of metal from acid corrosion. The DDGS extract was added at 2% by weight to the acid formulations listed in Table 1 to form respective DDGS extract solutions. Steel panels (C-1010) were pre-weighed and immersed in the DDGS extract solutions for 24 hours at 40° C. Plain acid solutions were used as a control. After 24 hours, the panels were rinsed and weight was checked. For each test panel, the weight loss % (WL) was calculated as $100*[(WS-WF)/WS]$, where WS=starting weight and WF=finished weight. Corrosion protection (%) was calculated as $100*[WL_C-WL_S)/WL_C]$, where $WL_C$=the weight loss of the test panel as tested with the control solution, and $WL_S$=the weight loss of the test panel as tested in the DDGS extract solution. The testing results are demonstrated in Table 1 below. Thus, the material is a good candidate to be used for prevention of corrosion following pickling or acid cleaning of steel.

TABLE 1

| Acid | Acid concentration in water | Corrosion protection |
|---|---|---|
| Hydrochloric | 10% | 97% |
| Sulfuric | 10% | 95% |
| Phosphoric | 10% | 90.9% |
| Citric | 20% | 87.7% |

An FTIR spectrum of the DDGS extract is shown in FIG. 1. The spectrum is dominated by peaks characteristic of corn oil. However, the peak at 1711 $cm^{-1}$ is indicative of a carboxylic acid (possibly fatty acid). The broad peak at 3359 $cm^{-1}$ is indicative of a small amount of hydrogen bonded water or possibly polyols (e.g. glycerol or butanediol).

The DDGS extract was also subjected to analysis by gas chromatography (GC) and liquid chromatography (LC) coupled with mass spectrometry (MS). The GC-MS showed 16 and 18 carbon fatty acids and ethyl esters, butanediol, tocopherol, ergost-5-en-ol, sigmast-5-en-3-ol, methoxy propanol, ethoxy ethanol, and a large number of minor peaks. The LC-MS also showed a large number of peaks.

Example 2

DDGS Extract Use with Rust Removers

The DDGS extract from Example 1 (added at 2% by weight) may be used in combination with conventional rust removers (e.g. Cortec® VpCI-422 citrus acid-based rust remover; and Cortec® VpCI-426 citrus acid/phosphoric acid based rust remover), with no observed interference with the action of the rust remover.

Example 3

DDGS Extract Use as a Float Coat

Sea water causes severe corrosion of steel and alloys. In many cases, corrosion protection of metals in sea water is provided by permanent coatings, which is very costly. A more economical method to prevent corrosion of large metal structures exposed to sea water (holding or ballast tanks, offshore structures, etc.) is the use of 'float coats'—oil based rust preventatives (RP) with high affinity to metal. These products form an oily film on metal surfaces that inhibit corrosion of a vessel. Any extra of the RP 'floats' on the liquid/vapor interface providing additional corrosion protection by replenishment of the film adsorbed on the metal; and to some degree insulating the water based electrolyte from air oxygen.

A float coat of the DDGS extract from Example 1 was prepared by adding 0.5% by weight of the DDGS extract to artificial sea water, which itself was prepared from a blend of salts manufactured by Aquarium Systems of Mentor, Ohio, and sold as Instant Ocean®. The salt blend was dissolved in deionized water per the manufacturer's instructions, producing a solution that is approximately 3.6% dissolved salts by weight. The DDGS extract float coat was found to provide corrosion protection to metal samples.

Example 4

Crude Corn Oil Recovered from Ethanol Stillage

A sample of crude corn oil was obtained from a commercial ethanol producer. The crude corn oil was obtained from ethanol stillage by a centrifugal separation method as described in U.S. Pat. No. 7,601,858. This was tested according to the method described in Example 1, wherein the crude corn oil was added to the acid solutions at 2% by weight of the solution. The results are shown in Table 2. For comparison purposes, a sample of purified corn oil obtained from a grocery store was tested in parallel, and is also reported in Table 2.

TABLE 2

| Acid | Acid concentration in water | Corrosion protection Crude corn oil | Corrosion protection Pure corn oil |
|---|---|---|---|
| Hydrochloric | 10% | 96% | 0% |
| Sulfuric | 10% | 78% | 0% |

TABLE 2-continued

| Acid | Acid concentration in water | Corrosion protection Crude corn oil | Corrosion protection Pure corn oil |
|---|---|---|---|
| Phosphoric | 10% | 90% | 0% |
| Citric | 20% | 88% | Corrosion worse than control |

The above data demonstrate that corn oil alone is insufficient to provide the observed corrosion protection. Other oil-soluble components in the stillage are a necessary ingredient in the present inhibitor compositions.

The crude and pure corn oil samples were further tested for use as a float coat. The crude corn oil sample showed good corrosion protection equivalent to the DDGS extract in Example 3. The pure corn oil showed some corrosion protection relative to the control, but was much less effective than the crude corn oil sample or the DDGS extract.

What is claimed is:

1. A corrosion inhibitor composition, comprising an aqueous solution and an amount of an oily extract of stillage that is effective to reduce corrosion of a metal article.

2. A corrosion inhibitor composition as in claim 1 wherein said aqueous solution and said oily extract are in a two-phase system, wherein each phase of said system is substantially immiscible in one another.

3. A corrosion inhibitor composition as in claim 1 wherein said aqueous solution includes sea water.

4. A corrosion inhibitor composition as in claim 1 wherein said oily extract is from corn DDGS.

5. A corrosion inhibitor composition, comprising a two-phase system, wherein a first phase includes a liquidous corn stillage extract, and is substantially immiscible in a second phase of said two-phase system.

6. A corrosion inhibitor composition as in claim 5 wherein said second phase is aqueous.

7. A corrosion inhibitor composition as in claim 6 wherein said aqueous second phase includes sea water.

\* \* \* \* \*